US00RE40578E

(19) United States
(12) Reissued Patent
Trull et al.

(10) Patent Number: US RE40,578 E
(45) Date of Reissued Patent: Nov. 25, 2008

(54) APPARATUS FOR CHANGING OPERATING MODULES ON A COORDINATE POSITIONING MACHINE

(75) Inventors: Stephen James Trull, Wickwar (GB); David Roberts McMurtry, Stancombe (GB)

(73) Assignee: Renishaw PLC, Gloucestershire (GB)

(21) Appl. No.: 11/826,626

(22) PCT Filed: Mar. 27, 2003

(86) PCT No.: PCT/GB03/01354

§ 371 (c)(1),
(2), (4) Date: Sep. 27, 2004

(87) PCT Pub. No.: WO03/008347

PCT Pub. Date: Oct. 9, 2003

Related U.S. Patent Documents

Reissue of:
(64) Patent No.: 7,024,783
Issued: Apr. 11, 2006
Appl. No.: 10/509,011
Filed: Mar. 27, 2003

(30) Foreign Application Priority Data

Mar. 28, 2002 (GB) ..... 0207298

(51) Int. Cl.
*G01B 5/008* (2006.01)
*B23Q 3/155* (2006.01)

(52) U.S. Cl. ..... 33/503; 483/902
(58) Field of Classification Search ..... 33/503, 33/556, 557, 558, 559, 560, 561; 483/16, 483/34, 35, 38, 902
See application file for complete search history.

(56) References Cited

U.S. PATENT DOCUMENTS

| | | | |
|---|---|---|---|
| 3,281,934 | A | 11/1966 | Lehmkuhl et al. |
| 3,466,971 | A | 9/1969 | Meyer |
| 3,526,033 | A | 9/1970 | Saunders |
| 3,953,039 | A | 4/1976 | Hauge et al. |
| 4,135,278 | A | 1/1979 | Kitamura |
| 4,349,946 | A | 9/1982 | McMurtry |
| 4,499,650 | A | 2/1985 | Cannon et al. |
| 4,520,550 | A | 6/1985 | Dunn et al. |
| 4,563,800 | A | 1/1986 | Bonga |
| 4,631,834 | A | 12/1986 | Hayashi et al. |
| 4,761,877 | A | 8/1988 | Rupp |
| 4,827,599 | A | 5/1989 | Winkler et al. |
| 4,897,014 | A | 1/1990 | Tietze |
| 4,905,369 | A | 3/1990 | Kawamura et al. |
| 4,979,284 | A | 12/1990 | McMurtry et al. |
| 5,011,297 | A | 4/1991 | Tittl |

(Continued)

FOREIGN PATENT DOCUMENTS

| | | | |
|---|---|---|---|
| DE | 3404497 | A1 | 8/1985 |
| EP | 0 566 719 | B1 | 10/1993 |
| JP | A-54-64780 | | 5/1979 |
| JP | 54064780 | | 5/1979 |
| JP | 2005096063 | A * | 4/2005 |

*Primary Examiner*—R. A. Smith
(74) *Attorney, Agent, or Firm*—Oliff & Berridge, PLC

(57) ABSTRACT

A storage port (20) for separating a magnetically coupled task module (18) from a modular probe (16) mounted on a machine comprises a housing (22) and arm (24) receivable by the task module (18). A mechanism is provided for separating the task module from the probe body using a mechanical advantage, such that physical movement of the machine actuates the mechanism thereby separating the task module (18) from the modular probe (16). The arm (24) may be rotatable about a pivot (26) such that on moving the probe upwards, the task module (18) is also pulled upwards, causing the arm (24) and hence the task module (18) to rotate about the pivot (26) and thus breaking contact between the task module (18) and the probe (16) with a tilting action. Damping means (38, 48, 60, 62) are provided to ensure smooth and controlled movement of the arm (24).

56 Claims, 9 Drawing Sheets

U.S. PATENT DOCUMENTS

| | | | |
|---|---|---|---|
| 5,028,901 | A | 7/1991 | Enderle et al. |
| 5,074,028 | A | 12/1991 | Strasser |
| 5,101,548 | A | 4/1992 | McMurtry et al. |
| 5,195,826 | A | 3/1993 | Enderle et al. |
| 5,251,156 | A | 10/1993 | Heier et al. |
| 5,499,963 | A | 3/1996 | Fujimoto et al. |
| 5,674,170 | A | 10/1997 | Girardin |
| 5,772,566 | A | 6/1998 | Schweizer et al. |
| 5,860,901 | A | 1/1999 | Haninger et al. |
| 5,918,378 | A | 7/1999 | McMurtry et al. |
| 6,012,230 | A | 1/2000 | McMurtry et al. |
| 6,416,450 | B2 | 7/2002 | Susnjara |
| 6,430,828 | B1 | 8/2002 | Ulbrich |
| 6,772,527 | B1 | 8/2004 | Butter et al. |
| 6,783,484 | B2 | 8/2004 | Muller |

* cited by examiner

APPARATUS FOR CHANGING OPERATING MODULES ON A COORDINATE POSITIONING MACHINE

Matter enclosed in heavy brackets [ ] appears in the original patent but forms no part of this reissue specification; matter printed in italics indicates the additions made by reissue.

This invention relates to apparatus for changing operating modules on a coordinate positioning machine. Co-ordinate positioning machines include, particularly but not specifically, co-ordinate measuring machines (CMM), machine tools and manual co-ordinate measuring arms.

Our earlier European patent 0566719 discloses a touch probe comprising a retaining module (such as a sensing module) and a task module (such as a stylus module). The task module is releasably mounted on the retaining module by magnetic means. A magazine comprising a plurality of storage ports is provided for the housing of task modules. The storage ports each comprise a base with a pair of jaws, the jaws having parallel docking inserts.

The probe may be mounted on the quill of a machine which transports the probe to the storage port into which the task module is inserted. The task module has a circular lip, the upper edge of which abuts the lower surfaces of the docking inserts and which is held in place by magnetic attraction.

The task module is separated from the retaining module by upwards movement of the quill which, as the task module is retained by the storage port, breaks the contact between them.

Such a magazine and task modules enable engagement of a task module by a retaining module, and disengagement of the task module from the storage port in a single continuous movement and without any additional machine apparatus (such as dedicated motors or electromagnets).

This method has the disadvantage that the magnetic force between the retaining module and the task module may be large and the force required to separate them will thus also be large. This is particularly so in the case of large probes where a large magnetic force is required in order to support a large and heavy task module.

The present invention provides a storage port for separating a releasably coupled task module from a retaining module, said retaining module and storage port being located on different and relatively movable parts of a machine, the storage port comprising:

a member for engagement with a task module;

a mechanism for separating the task module from the probe body using a mechanical advantage;

whereby physical movement of the retaining module relative to the storage port actuates the mechanism, thereby separating the task module from the retaining module.

This storage port thus allows a task module coupled to a retaining module by a strong magnetic force to be easily separated.

The mechanism may work by levering the task module and retaining module apart. The member may be part of the mechanism.

In one embodiment the member is rotatable about a pivot in the storage port, such that on moving the retaining module upwards the task module is also pulled upwards, causing the member and hence the task module to rotate about the pivot and thus breaking contact between the task module and the retaining module with a tilting action.

Preferably the member has a U-shaped cut-out for receiving the task module. The U-shaped cut-out may be provided with sprung fingers to hold the task module in position on the member. The sprung fingers may be integral with the member. Alternatively the task module may be held in position on the member by magnetic attraction.

Preferably a damper is provided to ensure smooth and controlled movement of the member.

The damper may comprise a damping plate which is adjacent and substantially parallel to one of the member and a surface of the storage port and mounted on the other of the member and the surface; wherein a viscous substance is provided between the damping plate and said one of the member and the surface; such that on movement of the member, the damping plate moves with respect to said one of the member and the surface.

Alternatively, the damping may be provided by the pivot which is made from a flexible substance.

In another embodiment the mechanism includes said member for engagement with the task module, a second member for engagement with the retaining module and means to separate the two members on movement of the machine and retaining module upwards when the retaining module is located in the storage port.

The means to separate the two members may comprise a cam located between the two members which is caused to rotate on upwards movement of the retaining module when said retaining module is located in the storage port, thereby forcing the two members apart.

A rack and pinion arrangement may be used to cause rotation of the cam on said upwards movement of the retaining module. Biasing means may be provided to bias the member and second member towards one another.

The retaining module and task module may comprise the body of a modular probe and a stylus module respectively. The retaining module could comprise a probe head such an articulating probe head which allows rotational movement about at least one axis and the task module could comprise a probe.

Preferred embodiments of the invention will now be described by way of example, with reference to the accompanying drawings wherein.

Figure 1:
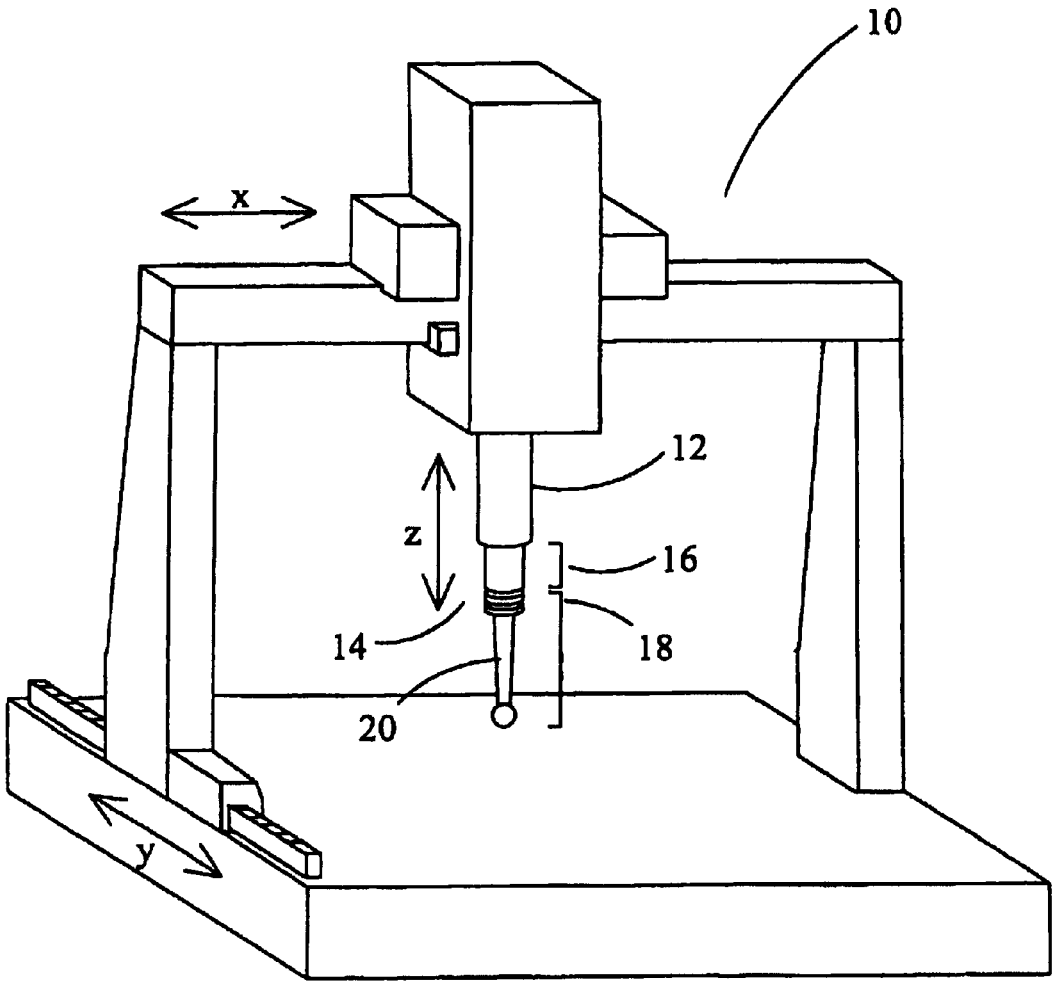
Fig 1 Prior Art
FIG. 1 is a perspective view of a coordinate measuring machine carrying a probe.

FIG. 1 shows a coordinate measuring machine (CMM) 10 in which a quill 12 may be moved in X, Y and Z by motors on the CMM (not shown). A probe 14 is mounted on the quill 12 and comprises a retaining module 16 which is attached to the quill 12 of the CMM and a task module 18 which is releasably mounted on the retaining module 16. The retaining module may comprise a sensing module which houses the sensing mechanism of the probe and the task module may comprise a stylus module. The position of the task module on the retaining module is defined by engagement between a set of kinematic elements on an upper surface of the task module with a set of kinematic elements on a lower surface of the retaining module. These kinematic elements may comprise, for example, three cylindrical rollers spaced at 120 degrees about the longitudinal axis of the probe on one of the modules engageable with three pairs of balls similarly spaced on the other of the modules. The respective elements are held in engagement by the attraction between magnets provided on both the retaining and task modules.

The modular construction of the probe enables automatic exchange of styli and other task modules. To provide a truly flexible measuring system, a plurality of task modules must be retained within the working area of the machine to enable automatic exchange of one task module for another.

A storage port is provided on the CMM to house a task module. Several storage ports may be accommodated together in a magazine. A task module housed in a storage port may be picked up by the retaining module or a task module may be deposited into an empty storage port by the retaining module. In this manner the probe may exchange task modules so that is uses the most suitable one for the task in hand.

The storage port will now be described with reference to FIGS. 2–6.

Figure 3A:
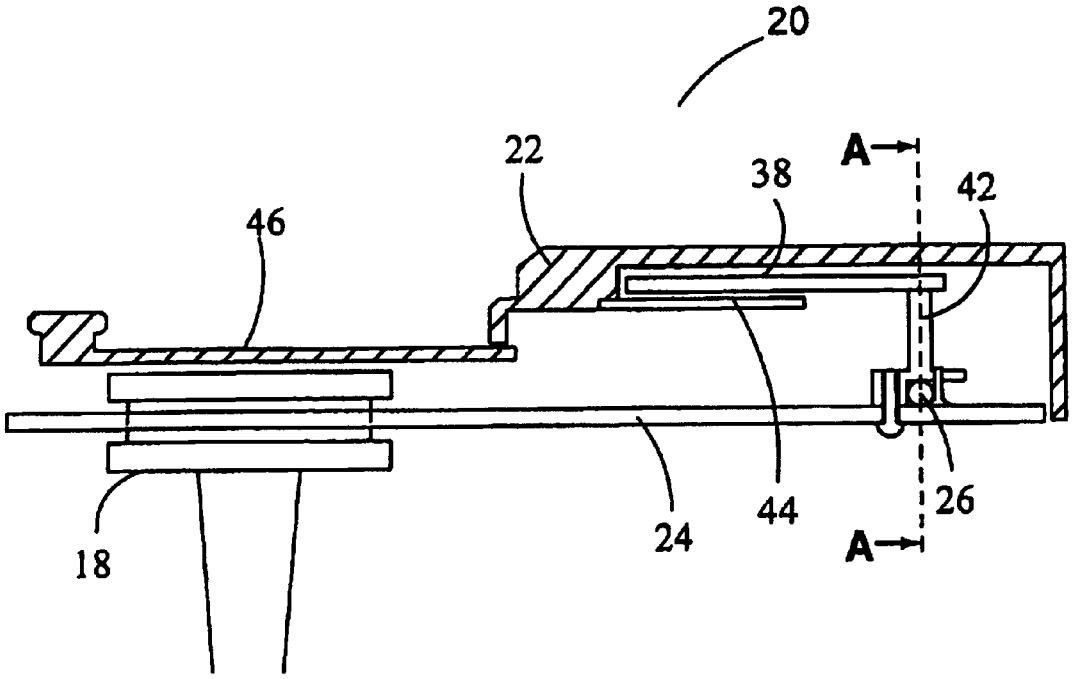
FIG. 3A is a cross section through the storage port with a task module inserted.
Figure 3B:
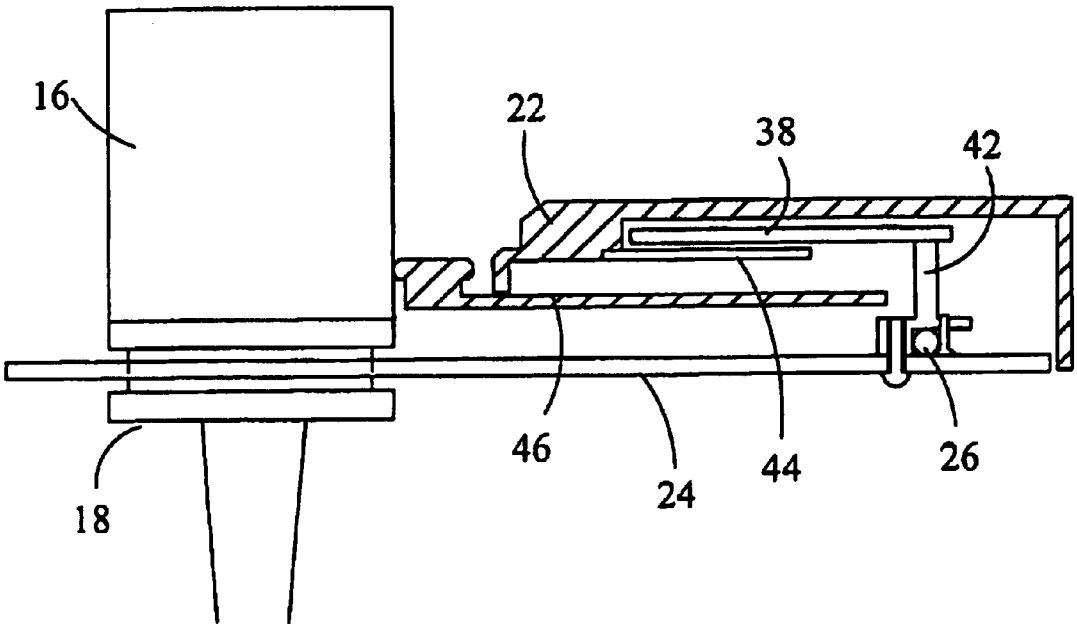
FIG. 3B is a cross section through the storage port with both the task module and retaining module inserted.

A cross section of the storage port is shown in FIGS. 3A and 3B. The storage port 20 comprises a housing 22 with a pivot arm 24 located within the housing and extending out from the housing at one end. The pivot arm 24 is rotatable a limited amount about a pivot 26 located within the housing 22.

Figure 5:
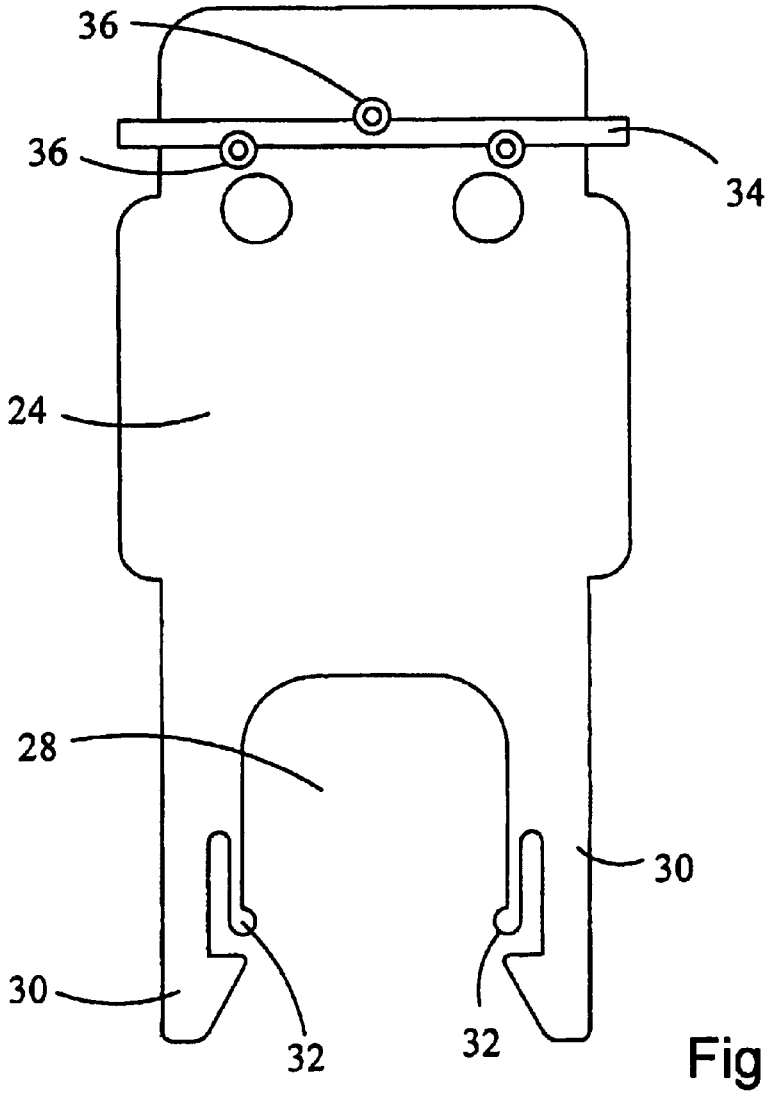
FIG. 5 is a plan view from above of the pivot arm in the storage port.

The part of the pivot arm 24 extending from the housing 22 has a U-shaped cut out 28 with two fingers 30 defining opposite sides, as shown in FIG. 5. These fingers 30 of the pivot arm 24 are designed to receive the task module 18 of the probe. The task module is provided with a pair of recesses on its outer surface into which the fingers are inserted. Alteratively it may have, for example an annular recess to receive the fingers.

The task module 18 may thus be inserted into the storage port 20 by horizontal movement of the quill 12 and retaining module 16 on which it is secured.

Figure 2A:
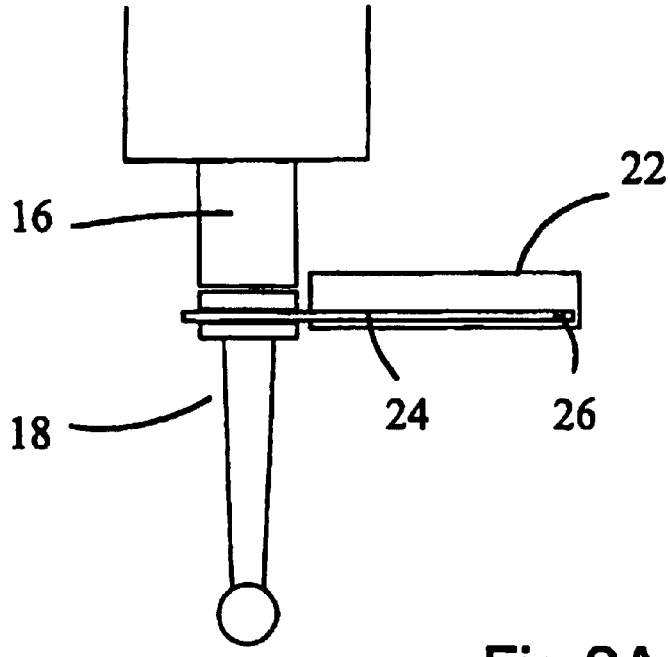
FIGS. 2A and 2B are schematic views of the probe positioned in the storage port.
Figure 2B:
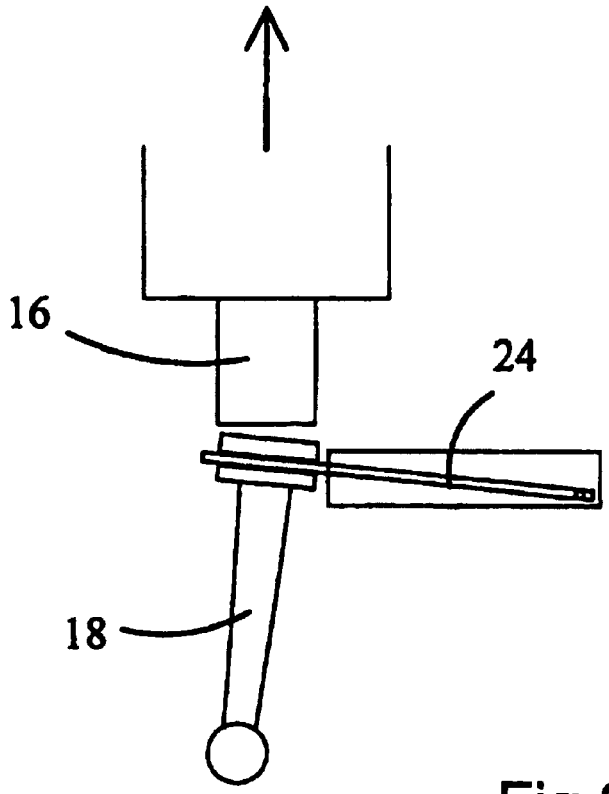

Once the task module 18 has been inserted into the storage port 20, as shown in FIG. 2A, the task module 18 may be separated from the retaining module 16 by moving the quill 12 and retaining module 16 upwards. As the task module 18 moves upwards, the end of the pivot arm 24 received by the task module 18 is also pulled upwards and rotates about its pivot 26. In doing so, it causes the task module 18 to likewise rotate and thus break contact with the retaining module 16 along one edge, as shown in FIG. 2B.

As the rotating motion of the pivot arm 24 causes the retaining module 16 to break contact with one edge of the task module 18, rather than pulling the two modules apart along the longitudinal axis of the probe, less force is required in separating the two modules.

The same tilting action of the pivot arm and task module can be produced by moving the storage port downwards whilst keeping the retaining module stationary.

Figure 4:
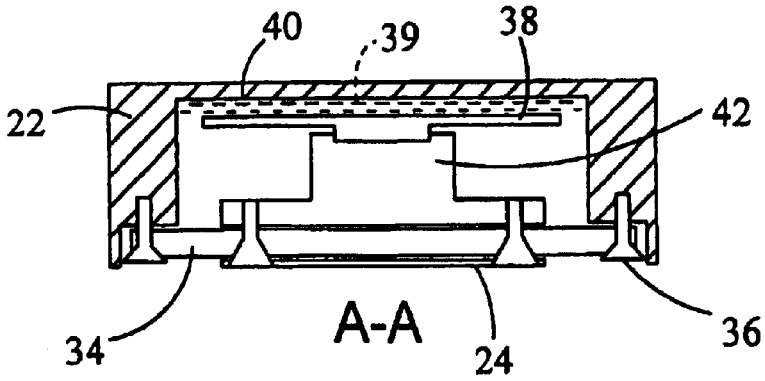
FIG. 4 is a cross section through line A—A of FIG. 3A.

The storage port is shown in more detail in FIGS. 3–5. FIG. 5 shows a plan view of the pivot arm 24 of the storage port. The U-shaped cut out 28 is provided with integral sprung fingers 32 to hold the task module in position. These sprung fingers 32 are deflected on inserting and removing the task module and once the task module is in position they are biased towards it, holding it in position.

The task module may be held in position on the pivot arm by other means, for example magnetic means.

As shown in FIGS. 4 and 5, the pivot arm 24 is rotatable about a pivot within the housing which comprises a spindle 34 which is attached to the housing 22 and pivot arm 24 respectively by countersunk screws 36. Other forms of pivot may be used.

It is desirable to provide damping for the rotatable pivot arm of the storage port to ensure that that the movement of the pivot arm is smooth and uncontrolled shocks are eliminated. Damping is provided by a damping plate 38 shown in FIGS. 3A, 3B and 4. The damping plate 38 lies substantially parallel to the upper inside surface 40 of the housing 22 and is separated from this surface by a viscous substance 39, such as grease. The damping plate 38 is connected to the pivot arm 24 by a damper push rod 42. As the pivot arm 24 rotates about the pivot, the damping plate 38 is caused to move with respect to the inner surface 40 of the housing 22. The grease in between the two surfaces has a damping effect and ensures that the movement of the pivot arm 24 is smooth.

A spring 44 is provided on an inner surface of the housing 22 which pushes against the damping plate 38 to ensure that the damping plate 38 is retained close to the inner surface 40 of the housing 22.

The storage port 20 may be provided with a lid 46 as shown in FIGS. 3A and 33. The lid is slidable between a first position shown in FIG. 3A, in which it covers the part of the pivot arm 24 extending from the housing 22 and a second position shown in FIG. 3B in which it is retracted inside the housing 22.

When a probe 14 is inserted into the storage port 20, the lid 46 is pushed into the housing 22 by the retaining module 16, as shown in FIG. 3B. The lid 46 is biased so that once the retaining module 18 has been removed, it slides back into its first position covering the part of the pivot arm 24 extending from the housing 22 and thus protecting the task module 18.

Figure 6:
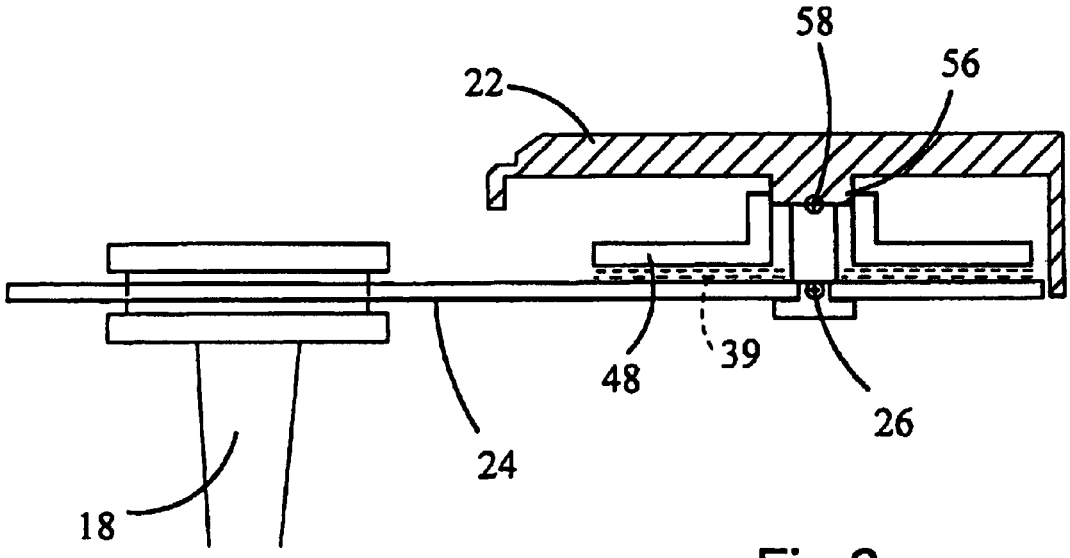
FIGS. 6 and 7 are cross sections through a second embodiment of the invention.
Figure 7:
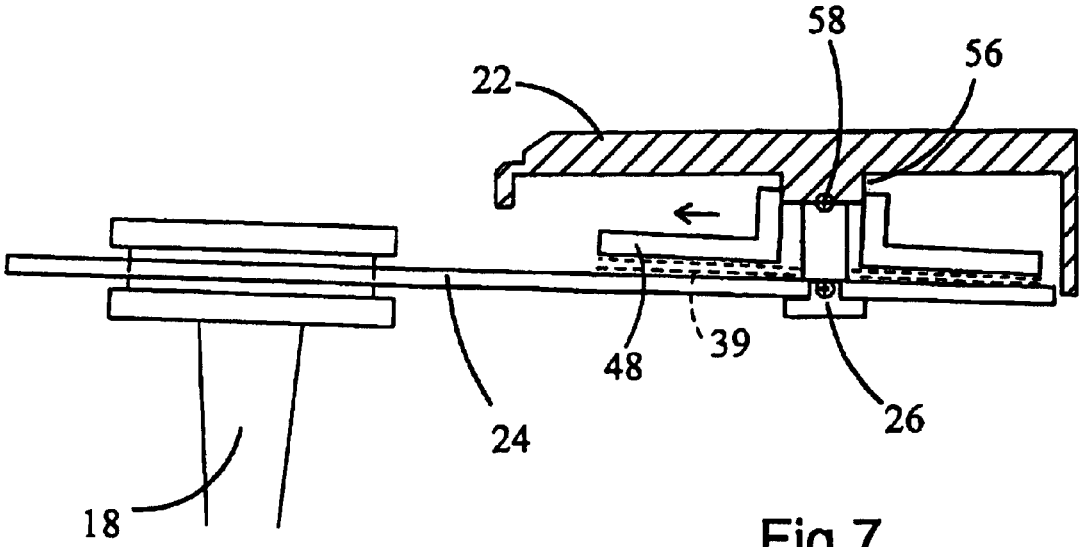
Figure 8:
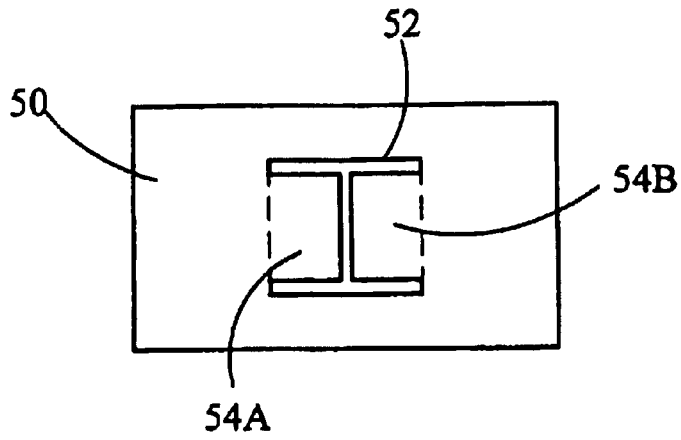
FIGS. 8 and 9 show the damper plate used in the second embodiment of the invention.
Figure 9:
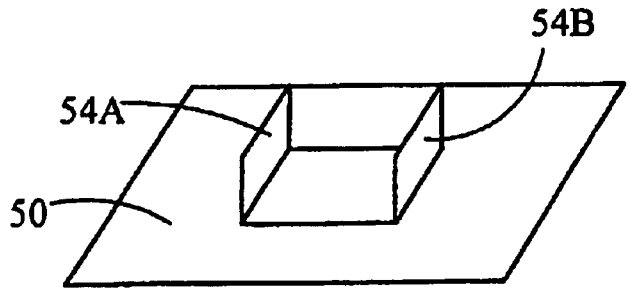

FIGS. 6 and 7 illustrate a second embodiment of the invention in which a different damping means is used. Similar parts to the first embodiment are identified by the same reference numbers. A damping plate 48 is provided within the housing 22 adjacent to the pivot arm 24 and with a viscous substance 39, such as grease, between them. The damping plate 48 is formed as shown in FIG. 8 in which a plate 50 has an I-shaped cut out 52 forming two portions 54A, 54B which may be folded into a perpendicular orientation with respect to the rest of the plate as shown in FIG. 9. The damping plate 48 is attached by these perpendicular portions 54A, 54B to a protrusion 56 from the upper inner surface of the housing 22 and is rotatable about this protrusion. On rotation of the pivot arm 24 about its pivot 26, the damping plate 48 is pushed in the direction shown by the arrow and pivots about its pivot 58, as shown in FIG. 7. This movement against the pivot arm 24 has a damping effect. A spring (not shown) may be provided to keep the damping plate close to the pivot arm.

Figure 10:
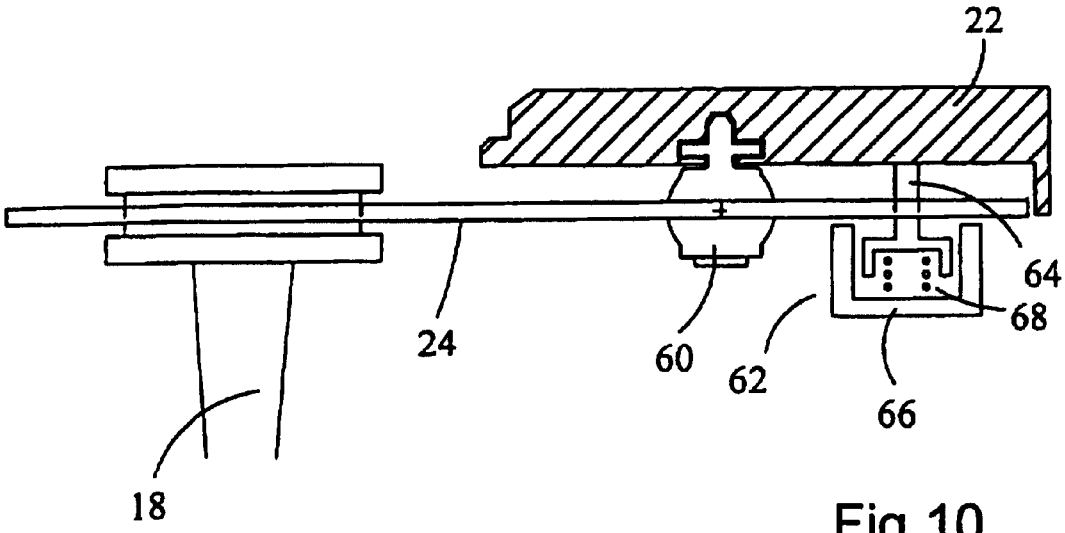
FIG. 10 is a cross section through a third embodiment of the invention.
Figure 11:
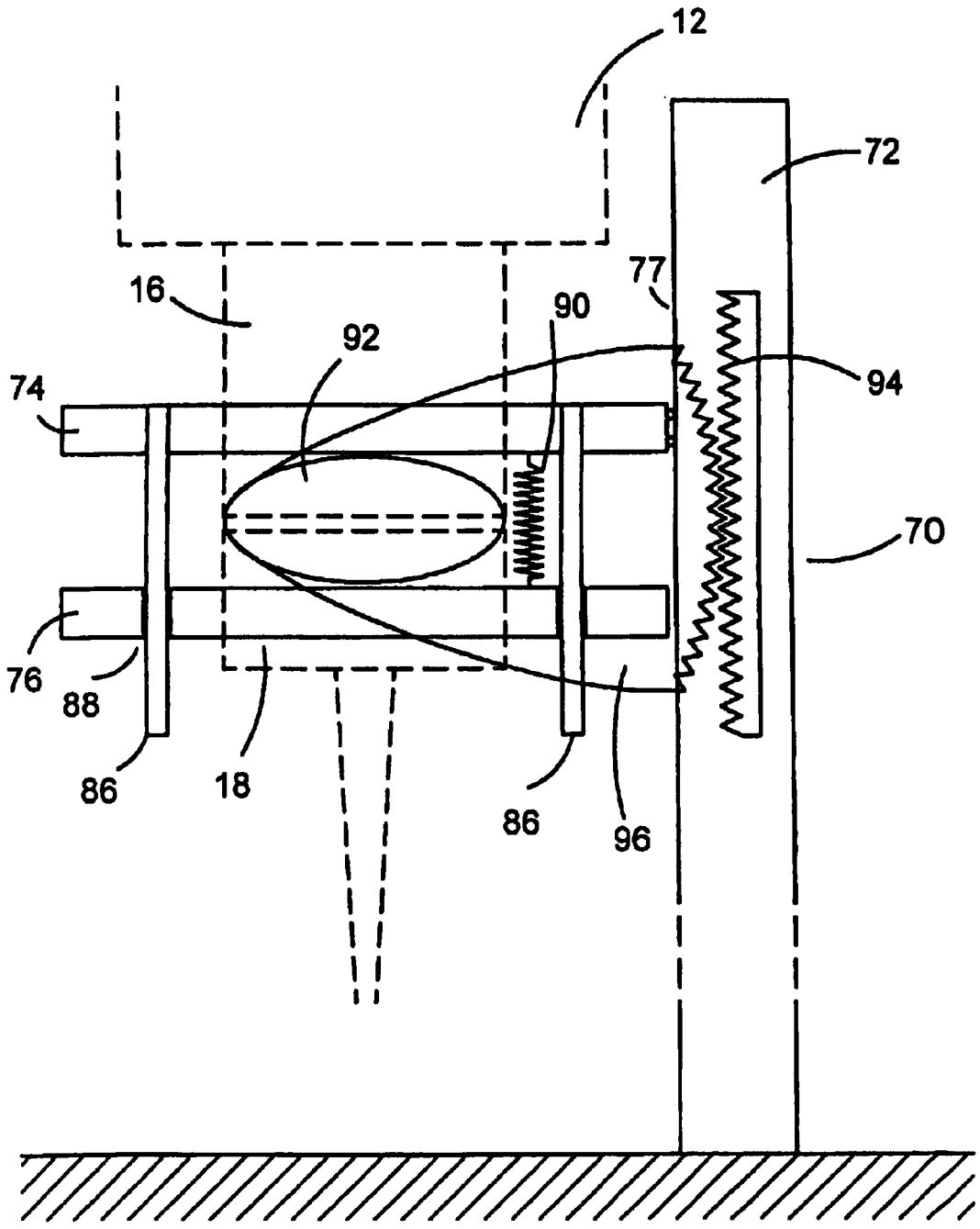
FIG. 11 is a cross section of a fourth embodiment of the invention in a first position.

A third embodiment of the invention showing another damping means is shown in FIG. 10. Again, similar parts to the first embodiment are identified by the same reference numbers. In this embodiment the pivot arm 24 rotates about a flexible pivot 60 which may be made from rubber or another suitable flexible substance. This flexible pivot 60 has the advantage that it also provides some damping. Additional damping may be provided by a separate damper 62, comprising for example a piston 64 attached to the housing 22 which is inserted into a reservoir 66 of grease mounted on the pivot arm. A spring 68 in the reservoir biases the pivot arm into its rest position.

A fourth embodiment of the invention will now be described with reference to FIGS. 11–14. In this embodiment the storage port 70 is mounted on a vertical post 72 and is provided with parallel upper and lower plates 74, 76 to engage the retaining and task modules 16, 18 respectively.

Figure 13:
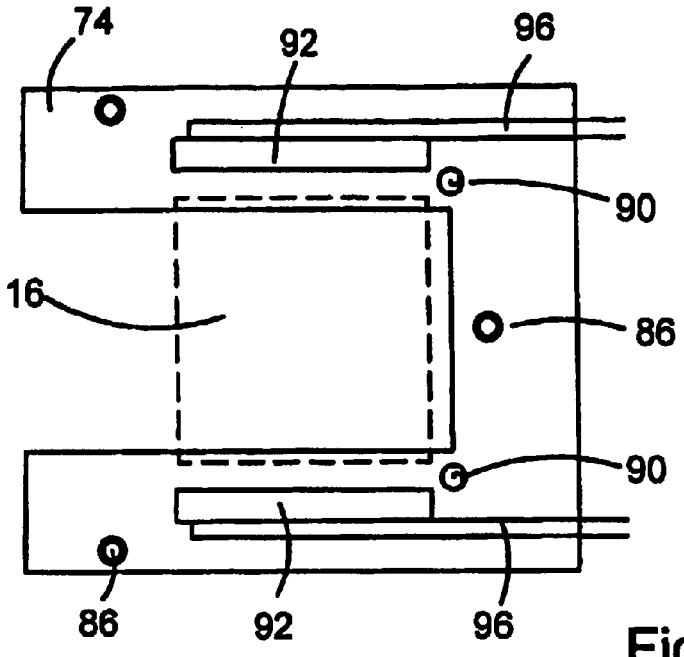
FIG. 13 is a plan view of the fourth embodiment illustrated in FIG. 11.
Figure 14:
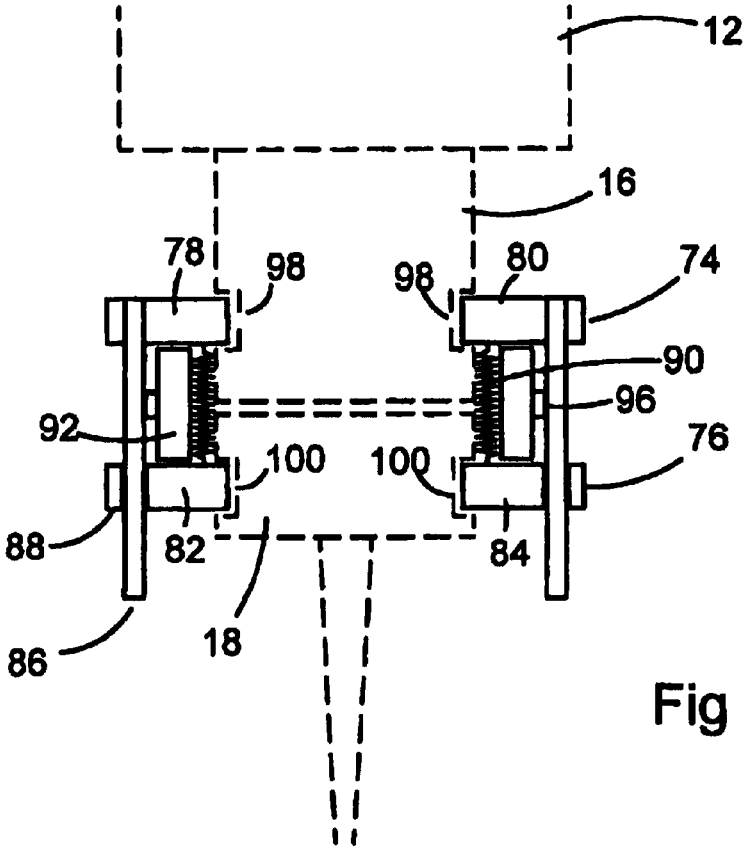
FIG. 14 is an end view of the fourth embodiment illustrated in FIGS. 11 and 13.

As shown in FIGS. 13 and 14, both upper and lower plates 74, 76 have U-shaped cut outs with fingers 78, 80, 82, 84 defining opposite sides. The fingers 78, 80, 82, 84 of the upper and lower plates 74, 76 are designed to receive the retaining and task modules 16, 18 respectively.

The vertical post 72 of the storage port is mounted on the CMM table. The post 72 is provided with a vertical track 77 along one edge onto which the upper plate 74 is mounted, thus allowing the upper plate 74 to slide up and down along the post 72.

The lower plate 76 is mounted from the upper plate 74 by pins 86 depending from the upper plate 74 which are received in apertures 88 of the lower plate 76. These pins 86 allow the lower plate 76 to move up and down relative to the upper plate 74 whilst keeping the plates 74, 76 parallel. The lower plate 76 is biased towards the upper plate 74 by a spring 90.

A cam 92 is located between the upper and lower plates 74, 76. A rack 94 and pinion 96 arrangement allows relative movement of the cam 92 with respect to the post 72. The pinion 96 is mounted on the cam 92 and the rack 94 is mounted on the vertical post 72.

In use, the CMM quill 12 manoeuvers the probe towards the storage port so that the probe is positioned in front of the U-shaped cut out of the upper and lower plates 74, 76. The probe is then moved horizontally into the storage port 70 so that the upper plate 74 engages with the retaining module 16 and the lower plate 76 engages with the task module 18. The receiving and task modules 16, 18 are each provided with recesses 98, 100 to receive the fingers 78, 80, 82, 84 of the upper and lower plates 74, 76.

Figure 12:
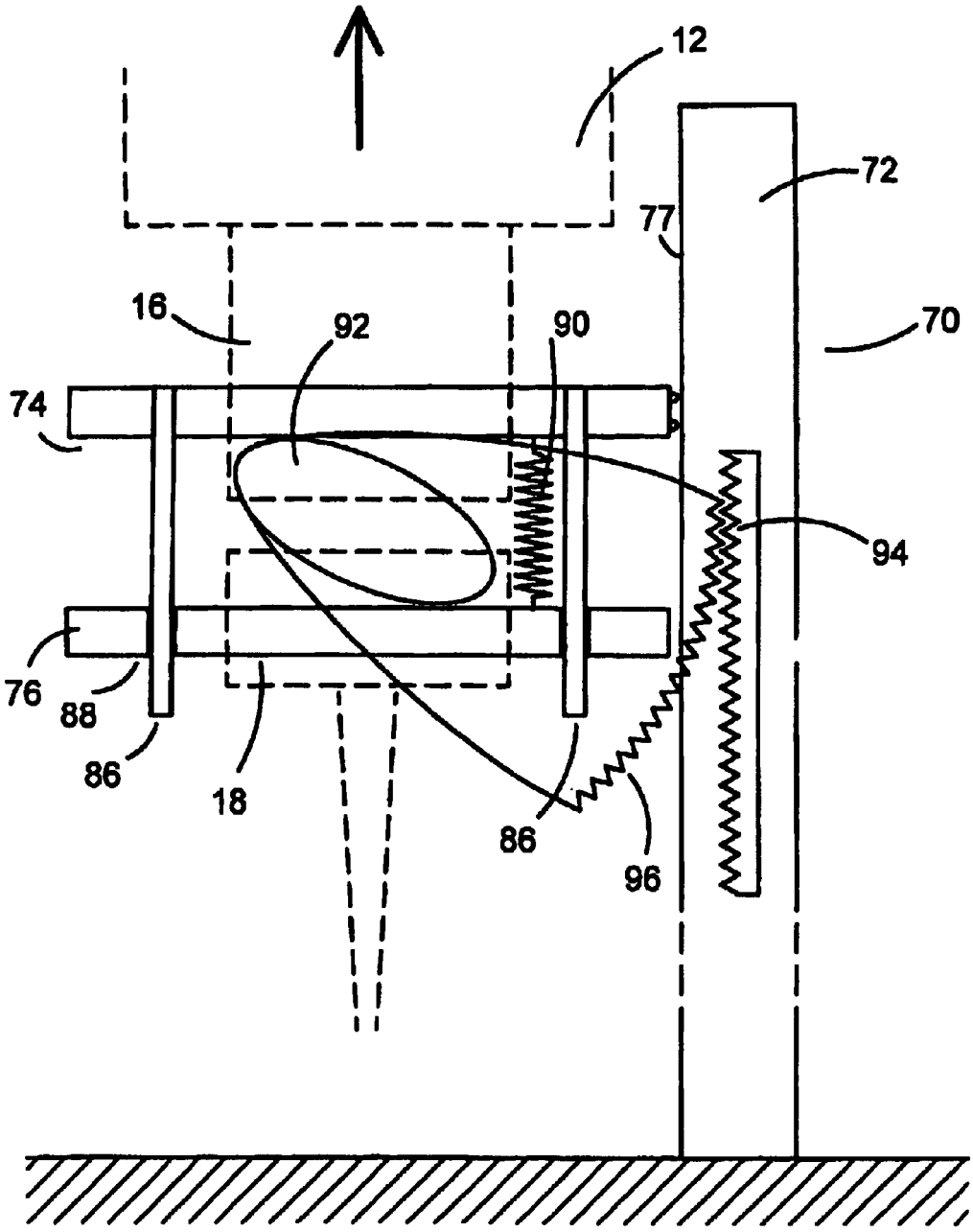
FIG. 12 is a cross section of a fourth embodiment of the invention in a second position.

Once the probe is engaged with the storage port 70, the quill 12 is moved upwards, as shown in FIG. 12. In doing so, both the upper and lower plates 74, 76 are also pulled upwards. This upward movement causes the pinion 96 to move along the rack 94 and thus rotate the cam 92. The rotation of the cam 92 pushes the lower plate 76 away from the upper plate 74, against the action of the spring 90. As the upper and lower plates 74, 76 are pushed apart by the cam 92, the receiving and task modules 16, 18 are separated.

Once the receiving and task modules 16, 18 are separated, the retaining module 16 may be removed from the upper plate 74 by moving the quill 12 horizontally away from the storage port 70 and thus disengaging the fingers 78, 80 of the upper plate 74 from the retaining module 16. The task module 18 will remain in the storage port 70.

In the above embodiments of the invention, relative movement of the retaining module and storage port is used to separate the retaining module from the task module by activating a mechanism in the storage port to create a mechanical advantage in separating the modules. Movement of the retaining module to activate the mechanism has the advantage that sufficient force is generated to separate the modules without the storage port needing to be provided with any powered apparatus, such as motors and electromagnets.

It is also possible to activate the mechanism by moving at least part of the storage port whilst the retaining module remains stationary.

This invention is not limited to the exchange of task modules of a modular probe. It is also suitable for exchanging probes mounted on a probe hand. For example it may be desirable to exchange between different types of probes such as contact touch trigger and sensing probes and also non-contact probes.

The invention claimed is:

1. A storage port for separating a releasably coupled task module from a retaining module, said retaining module and storage port being located on different and relatively movable parts of a machine, the storage port comprising:

a member for engagement with a task module;

a mechanism for separating the task module from the retaining module using a mechanical advantage;

whereby physical movement of the retaining module relative to the storage port actuates the mechanism, thereby separating the task module from the retaining module and whereby the mechanism has a tilting action which causes the task module to separate from the retaining module with a component of rotational motion.

2. A storage port according to claim 1 wherein the mechanism levers the task module and retaining module apart.

3. A storage port according to claim 2 wherein the member is part of the mechanism.

4. A storage port according to claim 3 wherein the member is rotatable about a pivot, such that on linear movement of the retaining module relative to the storage port the task module is also pulled linearly, causing the member and hence the task module to rotate about the pivot and thus breaking contact between the task module and the retaining module with a tilting action.

5. A storage port according to claim 3 wherein a damper is provided to ensure smooth and controlled movement of the member.

6. A storage port according to claim 5 wherein the damper comprises a damping plate which is adjacent and substantially parallel to one of the member and a surface of the storage port and mounted on the other of the member and the surface; wherein a viscous substance is provided between the damping plate and said one of the member and the surface; such that on movement of the member, the damping plate moves with respect to said one of the member and the surface.

7. A storage port according to claim 6 wherein biasing means are provided to push the damping plate against one of the member and the surface to which it is adjacent.

8. A storage port according to claim 5 wherein the damping is provided by the pivot which is made from a flexible substance.

9. A storage port according to claim 1 wherein the member has a cut-out for receiving the task module.

10. A storage port according to claim 9 wherein the cut-out is provided with sprung fingers to hold the task module in position on the member.

11. A storage port according to claim 10 wherein the sprung fingers are integral with the member.

12. A storage port according to claim 9 wherein the task module is held in position on the member by magnetic means.

13. A storage port for separating a releasably coupled task module from a retaining module, said retaining module and storage port being located on different and relatively movable parts of a machine, the storage port comprising:

a member for engagement with a task module;

a second member for engagement with the retaining module and means to separate the two members on upwards movement of the machine and retaining module when the modules are located in the storage port.

14. A storage port according to claim 13 wherein the means to separate the two members comprises a cam located between the two members which is caused to rotate on upwards movement of the retaining module, when said retaining module is located in the storage port, thereby forcing the two members apart.

15. A storage port according to claim 14 wherein a rack and pinion arrangement is used to cause rotation of the cam on said upwards movement of the retaining module.

16. A storage port according to claim 13 wherein biasing means are provided to bias the member and second member towards one another.

17. A storage port according to claim 13 wherein guide means are provided to maintain the member and the second member in a substantially parallel arrangement.

18. A storage port for separating a releasably coupled task module from a retaining module, said retaining module and storage port being located on different and relatively movable parts of a machine, the storage port comprising:

a relatively fixed member;

a relatively movable member which is engageable with a task module, said movable member being rotatable with respect to the fixed member about a pivot thereby to tilt said task module;

whereby when the task module is engaged with the movable member, linear movement of the retaining module relative to the storage port causes the movable member and the task module to rotate about the pivot, and thus breaking contact between the task module and the retaining module with a tilting action.

19. A storage port for separating a releasably coupled task module from a retaining module, said retaining module and storage port being located on different and relatively movable parts of a machine, the storage port comprising:

a member which is engageable with a task module;

a rotatable cam located between the task module and retaining module, when said modules are located in the storage port;

whereby rotation of the cam separates the task module from the retaining module.

*20. A storage port for separating a releasably coupled task module from a retaining module, at least one of the retaining module or the storage port being movable relative to the other, the storage port comprising:*

*a structure having (a) an opening for receiving the task module and (b) a portion that is configured so as to engage with the task module such that, upon movement of at least one of the retaining module or the storage port relative to the other, the task module is caused to tilt to thereby facilitate separation of the task module from the retaining module.*

*21. The storage port according to claim 20 wherein the opening is generally U-shaped.*

*22. The storage port according to claim 20 wherein the portion extends into the opening.*

*23. The storage port according to claim 20 wherein the portion engages with a recess in the task module.*

*24. The storage port according to claim 20 wherein the portion levers the task module and the retaining module apart.*

*25. The storage port according to claim 20 wherein the tilting causes the task module to initially break contact with the retaining module along one edge.*

*26. The storage port according to claim 20, including a plurality of fingers that hold the task module in position in the storage port.*

*27. The storage port according to claim 26 wherein the plurality of fingers comprises two fingers.*

*28. The storage port according to claim 26 wherein the fingers are biased towards the task module once the task module is in position in the storage port.*

*29. The storage port according to claim 26 wherein the fingers comprise sprung fingers.*

*30. The storage port according to claim 20 wherein the storage port includes a lid to cover and thereby protect the task module when it is separated from the retaining module.*

*31. The storage port according to claim 30 wherein the lid is biased towards a position where it covers the task module but is retractable so as to move out of the way when a task module is being inserted into or retrieved from the storage port.*

*32. A storage port for separating a releasably coupled task module from a retaining module, at least one of the retaining module or the storage port being movable relative to the other, the storage port comprising:*

*a member configured so as to engage with the task module such that, upon movement of at least one of the retaining module or the storage port relative to the other, the member causes a tilting action of the task module to thereby facilitate separation of the task module from the retaining module.*

*33. The storage port according to claim 32 wherein the member engages with a recess in the task module.*

*34. The storage port according to claim 32 wherein the member levers the task module and the retaining module apart.*

*35. The storage port according to claim 32 wherein the tilting causes the task module to initially break contact with the retaining module along one edge.*

*36. The storage port according to claim 32, including a plurality of fingers that hold the task module in position in the storage port.*

*37. The storage port according to claim 36 wherein the plurality of fingers comprises two fingers.*

*38. The storage port according to claim 36 wherein the fingers are biased towards the task module once the task module is in position in the storage port.*

*39. The storage port according to claim 36 wherein the fingers comprise sprung fingers.*

*40. The storage port according to claim 32 wherein the storage port includes a lid to cover and thereby protect the task module when it is separated from the retaining module.*

*41. The storage port according to claim 40 wherein the lid is biased towards a position where it covers the task module but is retractable so as to move out of the way when a task module is being inserted into or retrieved from the storage port.*

*42. A storage port for separating a releasably coupled task module from a retaining module, at least one of the retaining module or the storage port being movable relative to the other, the storage port comprising:*

*a task module holding area; and*

*a member configured so as to engage with the task module such that, upon movement of at least one of the retaining module or the storage port relative to the other, the member causes a tilting action of the task module to thereby facilitate separation of the task module from the retaining module.*

*43. The storage port according to claim 42 wherein the member extends into the task module holding area.*

*44. The storage port according to claim 42 wherein the member engages with a recess in the task module.*

*45. The storage port according to claim 42 wherein the member levers the task module and the retaining module apart.*

*46. The storage port according to claim 42 wherein the tilting causes the task module to initially break contact with the retaining module along one edge.*

*47. The storage port according to claim 42, including a plurality of fingers that hold the task module in position in the storage port.*

*48. The storage port according to claim 47 wherein the plurality of fingers comprises two fingers.*

*49. The storage port according to claim 47 wherein the fingers are biased towards the task module once the task module is in position in the storage port.*

*50. The storage port according to claim 47 wherein the fingers comprise sprung fingers.*

*51. The storage port according to claim 42 wherein the storage port includes a lid to cover and thereby protect the task module when it is separated from the retaining module.*

*52. The storage port according to claim 51 wherein the lid is biased towards a position where it covers the task module but is retractable so as to move out of the way when a task module is being inserted into or retrieved from the storage port.*

*53. A storage port for separating a releasably coupled task module from a retaining module, at least one of the retaining module or the storage port being movable relative to the other, the storage port comprising:*

*a generally U-shaped opening for receiving the task module; and*

*a member extending into the opening and configured so as to engage with a recess in the task module;*

*engagement between the member and the task module being such that, upon movement of at least one of the retaining module or the storage port relative to the other, the member causes the task module to tilt, and initially break contact with the retaining module along one edge, to thereby facilitate separation of the task module from the retaining module.*

*54. A machine comprising:*

*a retaining module;*

*a task module releasably coupled to the retaining module; and*

*a storage port;*

*at least one of the retaining module or the storage port being movable relative to the other;*

*the storage port comprising a member configured so as to engage with the task module such that, upon movement of at least one of the retaining module or the storage port relative to the other, the member causes a tilting action of the task module to thereby facilitate separation of the task module from the retaining module.*

*55. A magazine comprising at least one storage port for separating a releasably coupled task module from a retaining module, at least one of the retaining module or the storage port being movable relative to the other, the storage port comprising:*

*a task module holding area; and*

*a member configured so as to engage with the task module such that, upon movement of at least one of the retaining module or the storage port relative to the other, the member causes a tilting action of the task module to thereby facilitate separation of the task module from the retaining module.*

*56. The magazine according to claim 55 wherein the member extends into the task module holding area.*

* * * * *